(12) United States Patent
Harvey et al.

(10) Patent No.: US 8,468,884 B2
(45) Date of Patent: Jun. 25, 2013

(54) MOTOR CONTROLLED SPEED PIPELINE APPARATUS AND METHOD

(75) Inventors: Raymond Harvey, Newcastle-upon-Tyne (GB); Leon Fussell, Newcastle-upon-Tyne (GB); Francesco Zingoni, Florence (IT)

(73) Assignee: PII (Canada) Limited, Alberta (CA)

( * ) Notice: Subject to any disclaimer, the term of this patent is extended or adjusted under 35 U.S.C. 154(b) by 566 days.

(21) Appl. No.: 12/711,942

(22) Filed: Feb. 24, 2010

(65) Prior Publication Data
US 2010/0212749 A1 Aug. 26, 2010

Related U.S. Application Data

(60) Provisional application No. 61/155,485, filed on Feb. 25, 2009.

(51) Int. Cl.
*G01F 3/24* (2006.01)
*G01F 3/28* (2006.01)

(52) U.S. Cl.
USPC .......... 73/221; 73/861.45; 138/97; 405/184.1

(58) Field of Classification Search
USPC .......... 73/861.61, 1.25, 1.29, 861.42, 861.52, 73/861.62
See application file for complete search history.

(56) References Cited

U.S. PATENT DOCUMENTS

| | | | |
|---|---|---|---|
| 6,190,090 B1 * | 2/2001 | Campbell et al. | 405/211.1 |
| 6,575,078 B1 * | 6/2003 | Wright et al. | 91/491 |
| 6,752,175 B1 * | 6/2004 | Willschuetz et al. | 138/90 |
| 2008/0245258 A1 | 10/2008 | Herron et al. | |

FOREIGN PATENT DOCUMENTS

| | | |
|---|---|---|
| CN | 201288921 | 8/2009 |
| DE | 36 25 838 A1 | 2/1988 |
| DE | 3625838 A1 | 2/1988 |
| EP | 0 955 103 A1 | 11/1999 |
| EP | 0955103 A1 | 11/1999 |
| GB | 2 326 209 A | 12/1998 |
| GB | 2326209 A | 12/1998 |
| WO | 97/17566 A1 | 5/1997 |
| WO | 9717566 A1 | 5/1997 |

OTHER PUBLICATIONS

Search Report and Written Opinion, PCT/GB2010/050326, Jul. 6, 2010.
International Search Report and Written Opinion for International Application No. PCT/GB2010/050326, Jul. 6, 2010.
CN Official Action mailed Feb. 22, 2013, in related CN Application No. 201080009784.4.

* cited by examiner

*Primary Examiner* — Harshad R Patel
*Assistant Examiner* — Roger Hernandez-Prewitt
(74) *Attorney, Agent, or Firm* — Potomac Patent Group, PLLC (57) ABSTRACT

A pipeline apparatus has a body configured to fit inside a pipeline. A flow channel is formed within the body and includes an inlet, an outlet, and a bypass channel connecting the inlet and the outlet, the inlet being configured to receive a portion of a fluid flowing through the pipeline, and the outlet being configured such that the fluid flowing through the bypass channel flows out of the bypass channel through the outlet. A flow control valve is attached to the body and has a sleeve configured to move to vary a flow rate of the fluid flowing out of the outlet. A motor is provided in a chamber in the body and is configured to move the sleeve.

18 Claims, 7 Drawing Sheets

MOTOR CONTROLLED SPEED PIPELINE APPARATUS AND METHOD

RELATED APPLICATIONS

This application claims priority and benefit from Provisional Patent Application No. 61/155,485, filed Feb. 25, 2009, for "Methods and Systems for High Efficiency Variable Bypass Speed Control of Pipeline Inspection Tools and for Multi-Sensor Non-Destructive Pipeline Inspection", the entire contents of which are incorporated herein by reference.

BACKGROUND OF THE DISCLOSURE

1. Field of the Disclosure

The disclosure is directed to a pipeline apparatus and method, such as an apparatus and a method used to inspect or clean or tow an apparatus in an oil pipeline or a gas pipeline.

2. Discussion of the Related Art

It is known to use a pipeline inspection gauge or gadget (commonly referred to as a "pig") to inspect or clean a pipeline, or to tow a tool through the pipeline. For example, the pig may be used to clean contaminants from an interior wall of the pipeline. The pig also may be used to detect defects, such as pitting, corrosion, a crack, or a weld abnormality, in a wall of the pipeline. These defects may be detected in a variety of ways, including through detection of magnetic flux leakage after developing and while maintaining a magnetic field in the wall of the pipeline. Alternatively, defects may be detected ultrasonically. The pig may also be used to inspect a geometry of the pipeline, or determine a location within the pipeline.

Pig launching and receiving portions are connected to the pipeline. As the names suggest, the pig launching portion is used to launch or introduce the pig into the pipeline, while the pig receiving portion receives the pig after the pig has traveled from the launching portion through the pipeline.

Specifically, a pressure differential between upstream and downstream sides of the pig moves the pig from the launching portion, through the pipeline, and into the receiving portion. The pig may include an interior channel, and a portion of the fluid (e.g., oil or gas) flowing through the pipeline also flows through the channel. The interior channel allows the fluid to flow through the pig while allowing a pressure on the upstream side of the pig to be greater than a pressure on the downstream side of the pig. Thus, the pig moves downstream as a result of the pressure differential.

There are disadvantages associated with traditional pigs. For example, as the pig moves from the launching portion, through the pipeline, and into the receiving portion, the pressure differentials on the upstream and downstream sides of the pig change. This is because, for example, in a pipe bend, a valve, a section of reduced diameter pipe or some other restriction, the pig may experience a greater resistance to motion than it would in a straight pipe. As the pressure differential between the upstream and downstream sides of the pig changes, the speed of the pig changes.

But, it is desirable to design the interior channel so that the pig moves through the whole pipeline at a speed suitable for cleaning or inspecting the wall of the pipeline, or towing a tool through the pipeline, without going too fast and compromising the quality of the inspection or damaging the pig or the pipeline, or without going too slow and becoming trapped in a restricted bore or radiused section of the pipeline. Further, when the pig is used to inspect the wall of the pipeline by detecting magnetic flux leakage or ultrasonically, the pig needs to move at a speed slow enough to effectively inspect the pipeline but fast enough to avoid becoming trapped in the pipeline. Thus, once the pig is in the pipeline, if the pig is moving too fast to perform the inspection, the pig can be slowed by decreasing the flow rate of the fluid flowing through the pipeline. But, decreasing the flow rate is undesirable because it results in a reduction of a quantity of the fluid transported through the pipeline. After moving through the pipeline, the pig needs to also move with sufficient speed to be fully received in the receiving portion.

Alternatively, it is known to use a pig that includes an interior channel with an outlet through which fluid flows at variable flow rates. As the flow rate of fluid flowing through the outlet varies, the pressure differential between the upstream and downstream sides of the pig, and thus the speed of the pig, changes. The pig suffers from disadvantages, however, including the need for complex arrangements of components to vary the flow rate of the fluid flowing through the outlet, and reduced reliability resulting from complex control equipment.

SUMMARY OF THE DISCLOSURE

The disclosure overcomes one or more of the above-discussed disadvantages, or other disadvantages, of the known systems or methods.

The disclosure provides a pipeline apparatus. In the apparatus, a body is configured to fit inside a pipeline. A flow channel is formed within the body and includes an inlet, an outlet, and a bypass channel connecting the inlet and the outlet. The inlet is configured to receive a portion of a fluid flowing through the pipeline, and the outlet is configured such that the fluid flowing through the bypass channel flows out of the bypass channel through the outlet. A flow control valve is attached to the body and has a sleeve configured to move to vary a flow rate of the fluid flowing out of the outlet. A motor is provided in a chamber in the body and is configured to move the sleeve.

The disclosure further provides a pipeline inspection apparatus, which includes a body configured to fit inside a pipeline, and an inspection portion attached to the body. The inspection portion is configured to either magnetically inspect a wall of the pipeline, ultrasonically inspect the wall of the pipeline, inspect a geometry of the pipeline, or determine a location in the pipeline. A flow channel is formed within the body, and includes an inlet, an outlet, and a bypass channel connecting the inlet and the outlet. The inlet is configured to receive at least a portion of a fluid flowing through the pipeline, and the outlet is configured such that the fluid flowing through the bypass channel flows out of the bypass channel through the outlet. A flow control valve is attached to the body and includes a sleeve configured to move to vary a flow rate of the fluid flowing out of the outlet. A motor is provided in a chamber in the body and is configured to rotate to linearly move the sleeve.

The disclosure still further provides a method of inspecting a pipeline with a pipeline inspection apparatus. The method includes flowing fluid through a bypass channel formed in a body of the apparatus, to create a pressure differential between upstream and downstream sides of the apparatus moving the apparatus in the pipeline. A speed of the apparatus moving through the pipeline is determined. An area of an outlet is varied to change a flow rate of the fluid flowing through the outlet and to achieve a predetermined speed different from the determined speed. The predetermined speed is a speed at which a characteristic of the pipeline can be measured. The area is varied by moving a sleeve with a motor.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE DISCLOSURE

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the disclosure to "an exemplary embodiment," "an embodiment," or variations thereof means that a particular feature, structure, or characteristic described in connection with an embodiment is included in at least one embodiment of the subject matter disclosed. Thus, the appearance of the phrases "in an exemplary embodiment," "in an embodiment," or variations thereof in various places throughout the disclosure is not necessarily referring to the same embodiment. Further, the particular features, structures or characteristics may be combined in any suitable manner in one or more embodiments.

Figure 1:
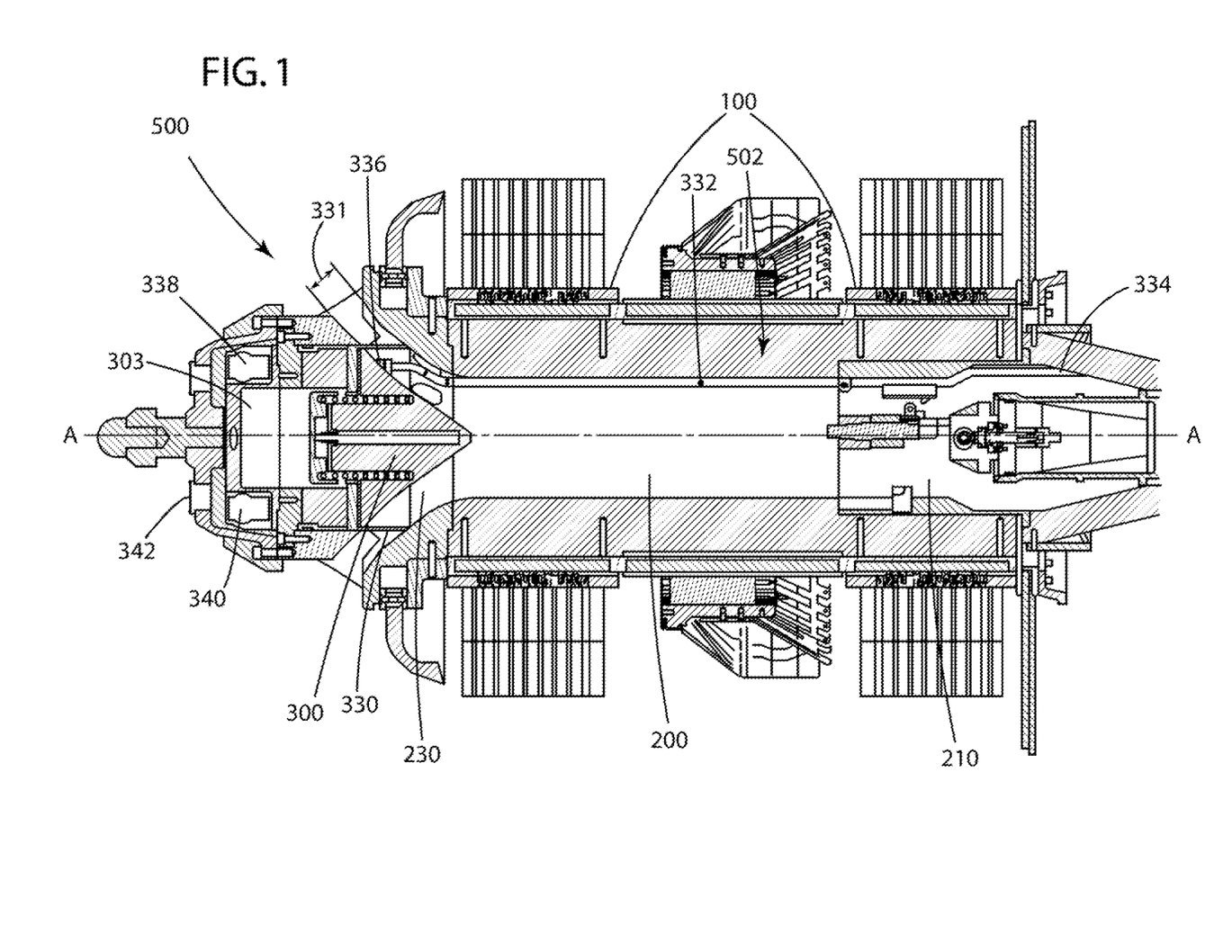
FIG. 1 is a side, cross-section view of a pipeline inspection apparatus in accordance with exemplary embodiments.

FIG. 1 is a side, cross-section view of a pipeline inspection apparatus (hereafter referred to as a "pig"), in accordance with the disclosure. As shown in the figure, the pig 500 includes inspection or cleaning portions 100 to inspect or clean a pipeline, such as an oil pipeline or a gas pipeline. For example, the inspection or cleaning portions 100 can clean contaminants from an interior wall of the pipeline. The inspection or cleaning portions 100 can detect defects, such as pitting, corrosion, a crack, or a weld abnormality, in the wall of the pipeline. These defects can be detected through detection of magnetic flux leakage, during which the pig 500 moves at a speed slow enough to develop and maintain a sufficient magnetic field in the wall of the pipeline but fast enough to avoid becoming trapped in the pipeline. Alternatively, the inspection or cleaning portions 100 may detect defects ultrasonically, or in a variety of other ways. The inspection or cleaning portions 100 of the pig 500 may also be used to inspect a geometry of the pipeline, or determine a location within the pipeline. Alternately, the pig 500 may be used to tow a tool through the pipeline, and may omit the inspection or cleaning portions 100 entirely.

The pig 500 can be introduced and launched into the pipeline through a pig launching portion. After the pig 500 moves through the pipeline, the pig 500 can be received in a pig receiving portion. Specifically, a pressure differential between an upstream side and a downstream side of the pig 500 can move the pig 500 from the launching portion, through the pipeline, and into the receiving portion. For example, with regard to FIG. 1, the front of the pig 500 is to the left of the figure and thus, a back pressure to the right of the figure is larger than a front pressure at the left of the figure. In other words, the fluid travels from right to left in FIG. 1.

As also shown in FIG. 1, the pig 500 includes a body 502 defining a fluid flow channel or path defined by an inlet 210 in fluid communication with a bypass channel 200, which is in fluid communication with an outlet 230. As shown in the embodiment illustrated in FIG. 1, the fluid flow path is disposed in an interior of the body 502 of the pig 500. Specifically, the bypass channel 200 is disposed such that a portion of a fluid (e.g., oil or gas) flowing through the pipeline also flows through the bypass channel 200. As broadly disclosed, the flow rate of the fluid flowing out of the outlet 230 is varied by adjusting the flow area 331. By this arrangement, the pressure differential between the upstream and downstream sides of the pig 500, and consequently the speed of the pig 500, can be adjusted.

FIG. 1 shows, according to an exemplary embodiment, a flow control valve 300 disposed partially within the outlet 230 of the bypass channel 200. As broadly disclosed, the flow control valve 300 can vary the flow rate of the fluid flowing out of the outlet 230. It is to be understood, however, that this disclosure does not require the use of the flow control valve 300, and does not require that the flow control valve 300 be disposed within the outlet 230 of the bypass channel 200. For example, a structure other than the flow control valve 300 can be disposed within the outlet 230. Alternately, the flow control valve 300 can be disposed within the inlet 210 of the bypass channel 200. Further, a structure other than the flow control valve 300 can be disposed within the inlet 210. Still further, multiple flow control valves 300 and/or multiple structures other than the flow control valves 300 can be disposed within both the inlet 210 and the outlet 230. Thus, it is to be understood that the disclosure broadly encompasses any structure or mechanism that varies the flow rate of the fluid flowing out of the outlet 230 relative to the flow rate of the fluid flowing into the inlet 210, which results in a variation of the pressure differential between the upstream and downstream sides of the pig 500.

Figure 2:
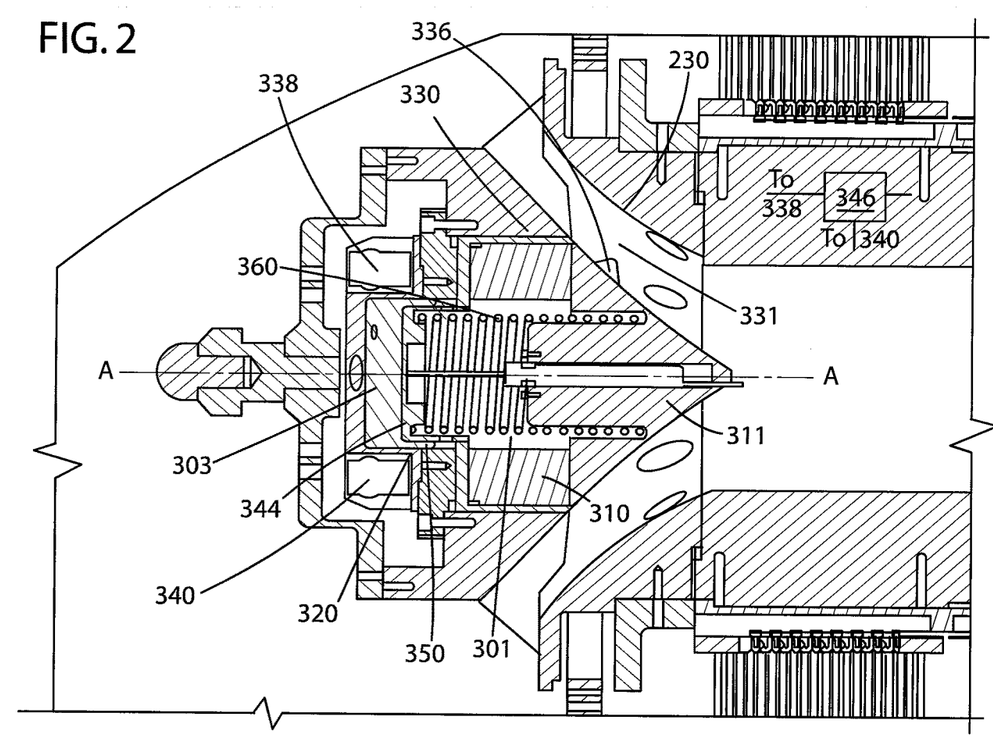
FIG. 2 is a side, cross-section view of a flow control valve of FIG. 1.

FIG. 2 shows a side, cross-section view of the flow control valve 300. The flow control valve 300 includes a sleeve 330 (discussed in detail below) to vary the flow rate of the fluid flowing out of the outlet 230 of the bypass channel 200, by reducing flow area 331 through which the fluid flows. Sleeve 330 is shown closed in FIG. 1 and open in FIG. 2. As shown in the figures, the flow area 331 is a minimum area defined inside the outlet 230, between a tip of the sleeve 330 and opposite wall of the outlet 230, extending perpendicular to the inside surface of the outlet 230. It is to be understood that although the drawings show the flow control valve 300 including the sleeve 330 that is used to vary the flow rate of the fluid flowing out of the outlet 230, the disclosure broadly encompasses any structure or mechanism of the flow control valve 300 that moves or is moved to vary the area of the outlet 230.

As shown in the figures, the flow control valve 300 includes an upstream cover 310 and a downstream cover 320. The upstream cover 310 includes a conical portion 311 that is disposed within the outlet 230 of the bypass channel 200. The conical portion 311, in conjunction with the sleeve 330, defines the flow area 331 through which the fluid flows out of the outlet 230. Thus, it is understood as the sleeve 330 moves, the flow area 331 increases or decreases, and the flow rate of the fluid flowing out of the outlet 230 correspondingly decreases or increases. The upstream cover 310 is connected to the downstream cover 320 to define a housing in which other components of the flow control valve 300 are disposed. Although the figures show the upstream cover 310 including the conical portion 311, the upstream cover 310 can include a portion having a different shape which defines the flow area 331 through which fluid flows out of the outlet 230.

The sleeve 330 is connected to a piston 344, which moves along axis A, between an upstream region 301 and a downstream region 303 of the flow control valve 300. The movement of the piston 344 along the axis A results in a corresponding movement of the sleeve 330 connected thereto, which increases or decreases the flow rate of the fluid flowing out of the outlet 230 of the bypass channel 200.

The sleeve 330 can be of various configurations, and it is therefore to be understood that the disclosure broadly encompasses different shapes, sizes, orientations, and/or locations of the sleeve 330. For example, the sleeve 330 can surround an about entire perimeter or circumference of the upstream cover 310. Alternately, the sleeve 330 can include two or more sleeves, each surrounding a portion of the circumference of the upstream cover 310. Further, the sleeve 330 need not surround about an entire circumference of the upstream cover 310, but rather can surround a portion of the circumference, such as about 25%, 50%, or 75% of the entire circumference. Still further, a shape and/or length of the sleeve 330 can be chosen such that the sleeve 330, when in a closed position, entirely closes the flow area 331 through which the fluid flows out of the outlet 230 of the bypass channel 200. Alternately, the length and shape of the sleeve 330 can permit at least some minimal fluid flow through the flow area 331 through which the fluid flows out of the outlet 230 even when the sleeve 330 is in the closed position. Thus, consistent with the disclosure, the flow control valve 300 can include any number of the sleeves 330, having any shape, size, orientation, or location, as long as the sleeve 330 moves in conjunction with movement of the piston 344 to vary the flow rate of the fluid flowing out of the outlet 230 of the bypass channel 200.

A rolling diaphragm 350 provides a fluid-tight seal that prevents fluid flow between the upstream and downstream regions 301, 303, when fluid is directed into the downstream region 303 to move the piston 344 along the axis A (discussed in detail below). It is to be understood, however, that the fluid-tight seal can be provided by another structure or mechanism other than the rolling diaphragm 350. The rolling diaphragm 350 can be captured between the upstream and downstream covers 310, 320. More than one rolling diaphragm 350 may be provided inside the flow control valve 300.

A spring 360 is disposed on the upstream region 301 of the flow control valve 300, between the upstream cover 310 and the piston 344. By this arrangement, the piston 344 and the sleeve 330 are biased and provide a force along the axis A toward the downstream region 303. Thus, during operation of the flow control valve 300, a portion of the fluid flowing through the pipeline (e.g., oil or gas) is flowed from upstream of the pig 500 into the downstream region 303. Specifically, as shown in FIGS. 1 and 2, the portion of the fluid flowing through the pipeline is flowed into an inlet 334 disposed at an upstream end of the pig 500, through a conduit 332 formed in the body 502 or the channel 200 of the pig 500, to an input or hole 336 in the flow control valve 300. The fluid continues to flow through an input pressure valve 338 in the flow control valve 300, into the downstream region 303, such that the downstream region 303 is pressurized. The fluid flows out of the downstream region 303 by opening an output valve 340. The fluid flows through the output valve 340 to an output 342, which is disposed at the downstream side of the flow control valve 300. Thus, the pressure within the downstream region 303 may be adjusted by opening and closing the valves 338 and 340 relative to one another. When pressurized, the pressurized downstream region 303 pushes against the piston 344, opposite to and countering the force applied by the spring 360. As a result, movement of the piston 344 and the sleeve 330 is provided by varying the flow rate of the fluid in the downstream region 303. Consistent with the invention, the spring 360 can be a linear spring.

Therefore, in accordance with the disclosure, the speed of the pig 500 can be adjusted by adjusting the flow rate of the fluid in the downstream region 303 of the flow control valve 300. For example, the pig 500 may be moving through the pipeline too fast to inspect the pipeline or tow a tool. As shown in FIG. 2, a controller 346 can be operatively connected to valves 338 and 340. The controller 346 can operate such that the valve 338 can be closed and the valve 340 can be opened, relative to one another. Thus, the pressure of the fluid in the downstream region 303 can be decreased, such that the piston 344 is urged by the spring 360 and moves toward the downstream region 303 along the axis A. As the piston 344 and the sleeve 330 move toward the downstream region 303, the flow area 331 through which fluid flows out of the outlet 230 increases, and the flow rate of the fluid flowing out of the outlet 230 increases. As a result, the speed of the pig 500 decreases.

Conversely, the pig 500 may be moving too slow. The controller 346 can operate such that the valve 338 can be opened and the valve 340 can be closed, relative to one another. Thus, the pressure of the fluid in the downstream region 303 can be increased, such that the piston 344 and the sleeve 330 move against the spring 360 and toward the upstream region 301 along the axis A. As the piston 344 moves toward the upstream region 301, the flow area 331 through which the fluid flows out of the outlet 230 decreases, and a flow rate of the fluid flowing out of the outlet 230 decreases. As a result, the speed of the pig 500 increases.

Although the speed regulating functioning of the pig 500 was discussed above with regard to valves 338 and 340, it is noted that more valves may be involved in the speed regulation. For example, a 2 position valve may be used for handling the speed of the pig when in the launch trap or the receive trap. A 3 position valve may be used while the pig is traveling inside the pipe and a another valve may be used as a backup valve in case that the 2 position valve fails. The valves may be solenoid based valves, e.g., an electro-mechanical valve that is controlled by an electric current through a solenoid coil. The valves may have two or more ports. The electric current is supplied from a power source that may be installed on the pig. The controller 346 is configured to close and open switches that connect the solenoid valves to the power source.

The controller 346 may be a processor, dedicated circuitry, software instructions or a combination thereof. The controller 346 may be configured to calculate a speed of the pig or to receive a speed of the pig in order for slowing or accelerating the pig. In one application, the controller 346 is connected to pressure sensors for determining a pressure differential between the front and back of the pig. In another application, the controller 346 is connected to a sensor configured to determine a traveling distance of the pig and based on a traveling time is able to calculate the speed of the pig. Other sensors may be used for determining the speed of the pig. In one application, the pig may include a connecting device (a hook for example) that may be attached to another device and the pig is used to tow the another device through the pipeline.

Figure 3:
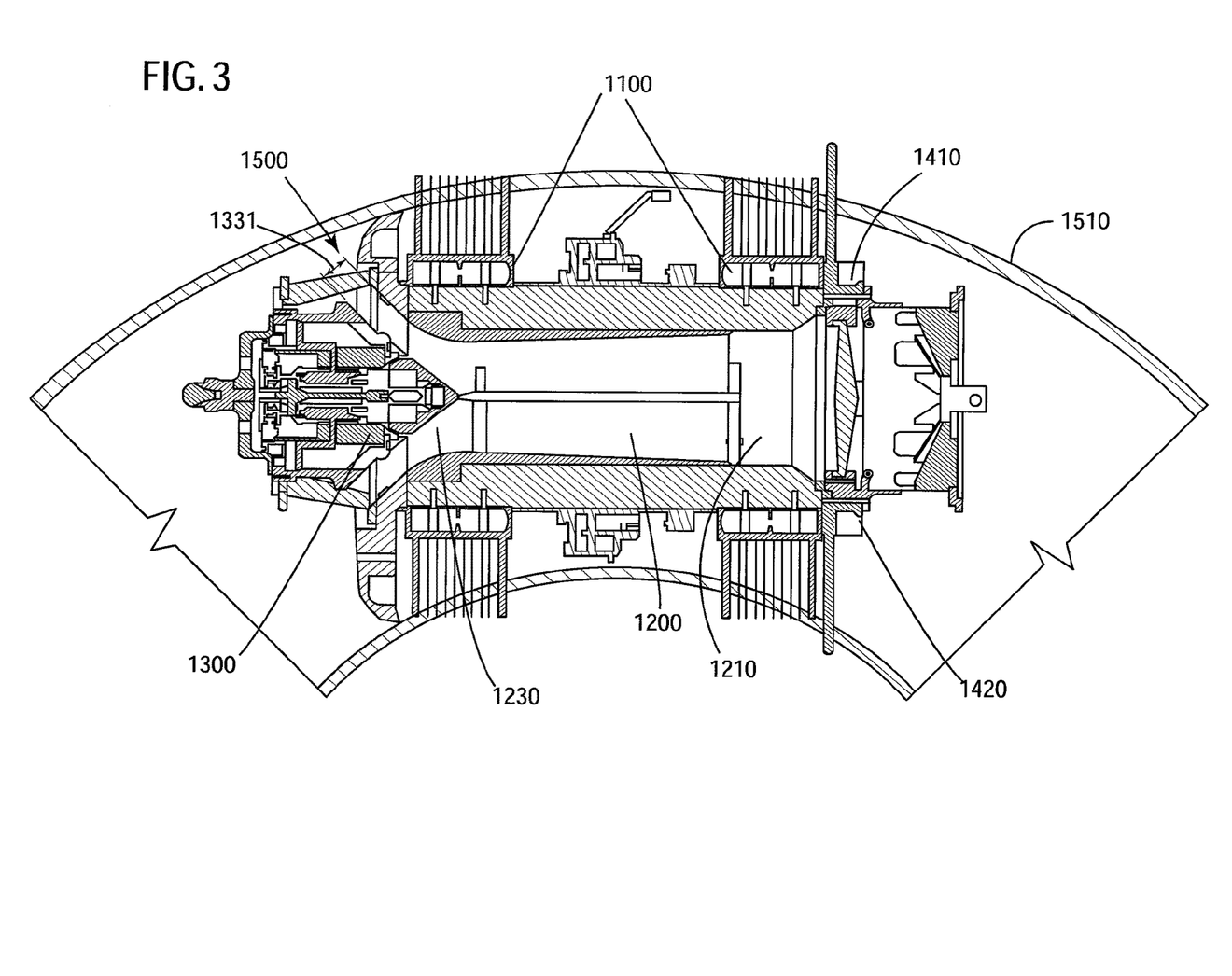
FIG. 3 is a side, cross-section view of another pipeline inspection apparatus, disposed in a pipeline, in accordance with exemplary embodiments.

FIG. 3 is a side, cross-section view of another pipeline apparatus, or pig, in accordance with another exemplary embodiment. As shown in the figure, the pig 1500 includes inspection or cleaning portions 1100, and is disposed in a pipeline 1510. The inspection or cleaning portions 1100 are similar to the inspection or cleaning portions 1100 discussed above. The pig 1500 may omit the inspection or cleaning portions 1100, and may be used to tow a tool through the pipeline. As also shown in FIG. 3, the pig 1500 includes a fluid flow channel or path defined by an inlet 1210 in fluid communication with a bypass channel 1200, which is in fluid communication with an outlet 1230. As shown in the illustrated embodiment, the fluid flow path is disposed in an interior of the pig 1500. Specifically, the bypass channel 1200 is disposed such that a portion of the fluid (e.g., oil or gas) flowing through the pipeline also flows through the bypass channel 1200. As broadly disclosed, a flow rate of the fluid flowing out of the outlet 1230 is varied relative to a flow rate of the fluid flowing into the inlet 1210. By this arrangement, the pressure differential between the upstream and downstream sides of the pig 1500, and consequently the speed of the pig 1500, can be adjusted.

FIG. 3 also shows a flow control valve 1300 disposed partially within the outlet 1230 of the bypass channel 1200. As broadly disclosed, the flow control valve 1300 varies the flow rate of the fluid flowing out of the outlet 1230. It is to be understood, however, that this disclosure does not require that the flow control valve 1300 be disposed within the outlet 1230 of the bypass channel 1200. For example, the flow control valve 1300 can be disposed within the inlet 1210 of the bypass channel 1200. Further, multiple flow control valves 1300 can be disposed within both the inlet 1210 and the outlet 1230.

Figure 4:
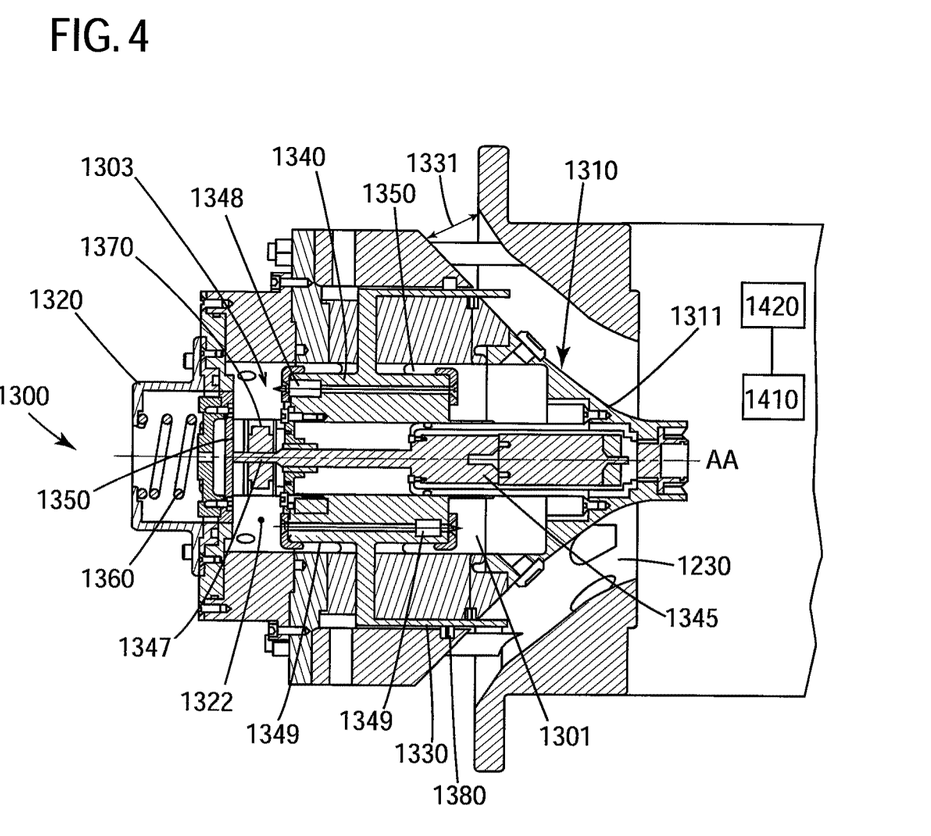
FIG. 4 is a side, cross-section view of a flow control valve of FIG. 3.

FIG. 4 shows a side, cross-section view of the flow control valve 1300. The flow control valve 1300 includes a sleeve 1330 to vary the flow rate of the fluid flowing out of the outlet 1230 of the bypass channel 1200; by varying a flow area 1331 through which the fluid flows out of the outlet 1230. As shown in the figures, the flow area 1331 is a minimum area defined between the outlet 1230 and a tip of the sleeve 1330, extending perpendicular to the outlet 1230. It is to be understood that although the drawings show the flow control valve 1300 including the sleeve 1330 that is used to vary the flow rate of the fluid flowing out of the outlet 1230, the disclosure broadly encompasses any structure or mechanism of the flow control valve 1300 that moves to vary the flow rate of the fluid flowing out of the outlet 1230.

As shown in FIGS. 3 and 4, the flow control valve 1300 includes an upstream cover 1310 and a downstream cover 1320. The upstream cover 1310 includes a conical portion 1311 that is disposed within the outlet 1230 of the bypass channel 1200. The conical portion 1311, in conjunction with the sleeve 1330, defines the flow area 1331 through which the fluid flows out of the outlet 1230. Thus, it is understood as the sleeve 1330 moves, the flow area 1331 increases or decreases, and the flow rate of the fluid flowing out of the outlet 1230 correspondingly decreases or increases. The upstream cover 1310 is connected to the downstream cover 1320 to define a housing 1322 in which other components of the flow control valve 1300 are disposed. Although the figures show the upstream cover 1310 including the conical portion 1311, the upstream cover 1310 can include a portion having a different shape which defines the flow area 1331 through which the fluid flows out of the outlet 1230.

The sleeve 1330 is connected to a piston 1340, which moves along axis AA between an upstream region 1301 and a downstream region 1303 of the flow control valve 1300. The movement of the piston 1340 along the axis AA results in a corresponding movement of the sleeve 1330, which increases or decreases the flow rate of the fluid flowing out of the outlet 1230 of the bypass channel 1200.

The sleeve 1330 can be of various configurations, and it is therefore to be understood that the disclosure broadly encompasses different shapes, sizes, orientations, and/or locations of the sleeve 1330. For example, the sleeve 1330 can surround an about entire perimeter or circumference of the upstream cover 1310. Alternately, the sleeve 1330 can include two or more sleeves, each surrounding a portion of the circumference of the upstream cover 1310. Further, the sleeve 1330 need not surround about an entire circumference of the upstream cover 1310, but rather can surround a portion of the circumference, such as about 25%, 50%, or 75% of the entire circumference. Still further, a shape and/or length of the sleeve 1330 can be chosen such that the sleeve 1330, when in a closed position, entirely closes the flow area 1331 through which the fluid flows out of the outlet 1230 of the bypass channel 1200. Alternately, the length and shape of the sleeve 1330 can permit at least some minimal fluid flow through the flow area 1331 through which the fluid flows out of the outlet 1230 even when the sleeve 1330 is in the closed position. Thus, the disclosure broadly encompasses any number of the sleeves 1330, having any shape, size, orientation, or location, as long as the sleeve 1330 moves in conjunction with movement of the piston 1340 to vary the flow rate of the fluid flowing out of the outlet 1230 of the bypass channel 1200.

A motor 1345 is disposed within the upstream cover 1310, on the upstream region 1301 of the flow control valve 1330. The motor 1345 may rotate a screw 1347, to which the piston 1340 is connected. The piston 1340 and the sleeve 1330 are prevented from rotating with the screw 1347, and therefore the piston 1340 and the sleeve 1330 move linearly along the screw 1347. Consistent with the disclosure, the motor 1345 can be a direct-current (DC), linear electric drive motor, or stepper motor. The motor may be fitted with an encoder to monitor a position of the sleeve and/or the sleeve may be fitted with limit switches and/or a linear transducer to monitor the position of the sleeve.

One or more rolling diaphragms 1350 provide a fluid-tight seal around the motor 1345 and screw 1347, on the upstream region 1301. Consistent with the disclosure, three rolling diaphragms 1350 can be used to provide a sealed chamber that completely encloses the motor 1345 and the screw 1347, and the sealed chamber can be filled with a low viscosity oil, such as a light mineral oil, to protect the motor 1345, the screw 1347, and associated components from debris or corrosion. The use of the lubricant can also facilitate movement of the piston 1340 along the axis AA. The fluid-tight seal prevents the lubricant surrounding the motor 1345 and screw 1347 from flowing out of the sealed chamber 1303.

One or more valves 1348 permit the lubricant to flow between both sides of the piston 1340 during movement of the piston 1340 along the axis AA. Consistent with the disclosure, two one-way check valves 1348 can be disposed in the piston 1340. One check valve 1348 can permit the lubricant to flow from upstream to downstream of the piston 1340, while the other check valve 1348 can permit the lubricant to flow from downstream to upstream of the piston 1340. It is to be understood, however, that valves 1348 need not be included in the flow control valve 1300. For example, even if the upstream region 1301 is filled with the lubricant, the piston 1340 can include one or more channels that do not include valves, which permit the lubricant to flow between both sides of the piston 1340.

A spring 1360 may be disposed on the downstream region 1303 of the flow control valve 1300, between the downstream cover 1320 and one of the rolling diaphragms 1350. The diaphragm 1350 pressure balances the lubricant on the upstream region 1301 with the fluid flowing through the pipeline, and the spring 1360 provides a slight bias that ensures correct action of the rolling diaphragms 1350. Consistent with the disclosure, the spring 1360 can be a linear spring.

A second spring, spring 1370, can urge the sleeve 1330 toward the open or closed position as required under certain conditions. Consistent with the invention, the spring 1370 can be a clock spring or spring motor located in the sealed chamber of the flow control valve 1300. The spring 1370 can be disposed around the screw 1347, such that the spring 1370 is wound as the screw 1347 rotates during movement of the piston 1340 and the sleeve 1330. The wound spring 1370 can then apply a rotational biasing force to the screw 1347. Specifically, the spring 1370 can be wound so that as the piston and sleeve are moved toward the upstream region 1303, so that the spring 1370 can apply a biasing force that tends to rotate the screw 1347 such that the piston 1340 and the sleeve 1330 are moved toward the downstream region 1301. Thus spring 1370 moves the sleeve 1330 toward the fully open position when the motor 1345 is not operating. When the sleeve 1330 is moved to the fully open position, the pressure differential on the upstream and downstream sides of the pig 1500 is minimized since the flow rate of the fluid out of the outlet 1230 is maximized, and the speed of the pig 1500 is also minimized.

It is to be understood, however, that the spring 1370 can be disposed to provide a biasing force tending to rotate the screw 1347 such that the piston 1340 and the sleeve 1330 are moved toward the downstream region 1303, so that the spring 1370 moves the sleeve 1330 toward the fully closed position when the motor 1345 is not operating. Thus, it is understood that the spring 1370 can move the sleeve 1330 toward the fully closed position when the motor 1345 is not operating. As discussed above, when the sleeve 1330 is moved to the fully closed position, the flow rate of the fluid out of the outlet 1230 is minimized, the pressure differential on the upstream and downstream sides of the pig 1500 is maximized, and the speed of the pig 1500 is also maximized. This prevents the pig 1500 from being trapped in the pipeline when one or more components of the flow control valve 1300, such as the motor 1345, fail, or when the pig enters a bent of the pipe that restricts its movement. It is to be understood, however, that the spring 1370 can be disposed to provide a biasing force tending to rotate the screw 1347 such that the piston 1340 and the sleeve 1330 are moved toward the downstream region 1303, so that the spring 1370 moves the sleeve 1330 toward the fully open position when the motor 1345 is not operating. When the sleeve 1330 is moved to the fully open position, the pressure differential on the upstream and downstream sides of the pig 1500 is minimized since the flow rate of the fluid out of the outlet 1230 is maximized, and the speed of the pig 1500 is also minimized.

The check valves 1348 are chosen such that the motor can bring about a sufficient pressure to open them whilst the clock spring cannot. This means that the piston 1340 can quickly move when actuated by the motor but slowly when actuated by the clock spring. A flow valve 1349 permits the lubricant to flow from upstream to downstream of the piston 1340 when the piston 1340 moves toward the upstream region 1301 by the spring 1370. Consistent with an exemplary embodiment, the flow valve 1349 can be a bleed valve, which allows the lubricant to flow, relatively slowly, from upstream to downstream of the piston 1340.

Figure 5:
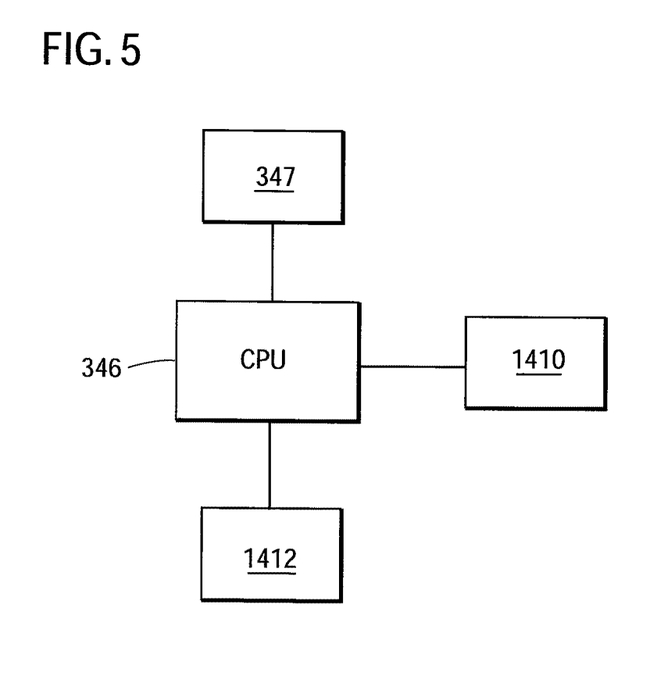
FIG. 5 is a block diagram of a controller of the pipeline inspection apparatus of FIG. 3.

Thus, in accordance with the disclosure, the speed of the pig 1500 can be adjusted by movement of the piston 1340 and the sleeve 1330 through operation of the motor 1345. For example, the pig 1500 may be moving through the pipeline too fast to inspect the pipeline or tow a tool through the pipeline. One or more speed sensors 1410 (or other type of sensors as would be appreciated by those skilled in the art) of the pig 1500 may be used to collect information for determining the speed of the pig 1500. As shown in FIG. 5, the speed sensor (or other sensors) 1410 provides the speed information to the controller 346. The controller 346 may include a central processing unit (CPU) that uses the speed information to determine the speed of the pig 1500, and compares the determined speed to a predetermined speed stored in a memory 347. When the determined speed is above the predetermined speed, the controller 346 sends a control signal to the motor to close the sleeve 1330 to slow the pig 1500. The motor may have a microprocessor 1420 that directly operates the motor 1345 to rotate the screw 1347, and the piston 1340 and the sleeve 1330 move linearly along the axis AA toward the downstream region 1303. As the piston 1340 and the sleeve 1330 move toward the downstream region 1303, the flow area 1331 through which fluid flows out of the outlet 1230 increases, and the pressure differential between the upstream and downstream sides of the pig 1500 decreases. As a result, the speed of the pig 1500 decreases. When it is determined that the pig 1500 is moving near or at the predetermined speed, such as by using one or more iterations of the above-described process, rotation of the screw 1347, and thus movement of the piston 1340 and the sleeve 1330, stops.

Conversely, the pig 1500 may be moving through the pipeline too slow. The speed sensor 1410 provides the speed information to the controller 346. The controller 346 relays the speed information to the CPU, which uses the speed information to determine the speed of the pig 1500, and compares the determined speed to a predetermined speed stored in memory 347. When the determined speed is below the predetermined speed, the CPU sends a control signal to the motor or the microprocessor 1420 to speed up the pig 1500. That is, the microprocessor 1420 may operate the motor 1345 to rotate the screw 1347, and the piston 1340 and the sleeve 1330 move linearly along the axis AA toward the upstream region 1301. As the piston 1340 and the sleeve 1330 move toward the upstream region 1301, the flow area 1331 through which the fluid flows out of the outlet 1230 decreases, and the pressure differential between the upstream and downstream sides of the pig 1500 increases. As a result, the speed of the pig 1500 increases. When it is determined that the pig 1500 is moving at or near the predetermined speed, such as by using one or more iterations of the above-described process, rotation of the screw 1347, and thus movement of the piston 1340 and the sleeve 1330, stops.

FIG. 5 shows other possible sensors 1412 that are configured to detect various parameters pertaining to the pig. For example, sensors 1412 may determine a pressure in front and/or back of the pig. While FIGS. 4 and 5 show a controller 346 and a processor 1420 that controls the motor, it is noted that only one controller/processor may be used to determine the speed of the pig, decide when to slow or accelerate the pig and to control the motor. Alternatively, the controller 346 may be a central controller that also collects information about the inspection activity while processor 1420 is configured to control the motor. Other combinations of functionalities for the controller 346 and/or microprocessor 1420 may be implemented.

Consistent with an exemplary embodiment, one or more sleeve seals 1380 can be used to remove debris from the sleeve 1330. Debris removal by the sleeve seal 1380 can prevent the sleeve 1330 from becoming trapped during movement along the axis AA. Consistent with the disclosure, the sleeve seal 1380 can be manufactured from or coated with polytetrafluoroethylene.

Figure 6:
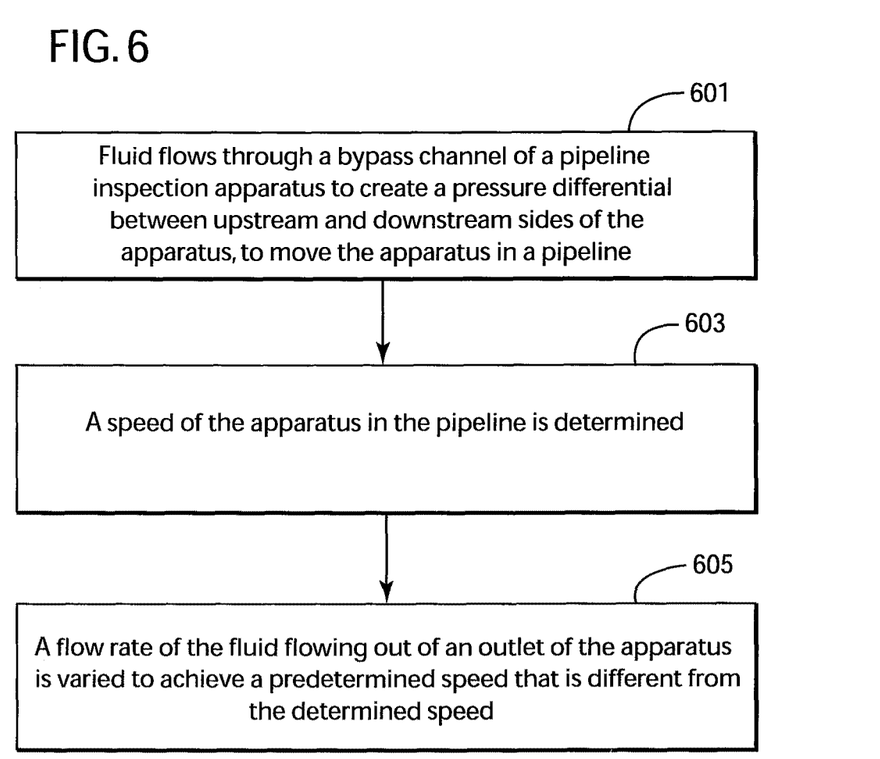
FIG. 6 is a flow chart illustrating a method of inspecting a pipeline with a pipeline inspection apparatus in accordance with exemplary embodiments.

FIG. 6 discloses an exemplary embodiment of a method of inspecting a pipeline with a pipeline inspection apparatus that includes a body configured to fit inside the pipeline, an inspection portion attached to the body and configured to inspect a wall of the pipeline, and a flow channel. The flow channel includes an inlet, an outlet, and a bypass channel connecting the inlet to the outlet, where the bypass channel is configured to traverse the body, the inlet is configured to receive fluid flowing through the pipeline, and the outlet is configured such that the fluid flowing through the bypass channel flows out of the bypass channel through the outlet. As shown in FIG. 6, the fluid can flow through the bypass channel to create a pressure differential, between upstream and downstream sides of the apparatus, to move the apparatus in the pipeline (step 601). A speed of the apparatus moving through the pipeline can be determined (step 603). A flow rate of the fluid flowing out of the outlet can be varied to achieve a predetermined speed that is different from the determined speed (step 605). The flow rate is varied by moving a sleeve with a motor.

Figure 7:
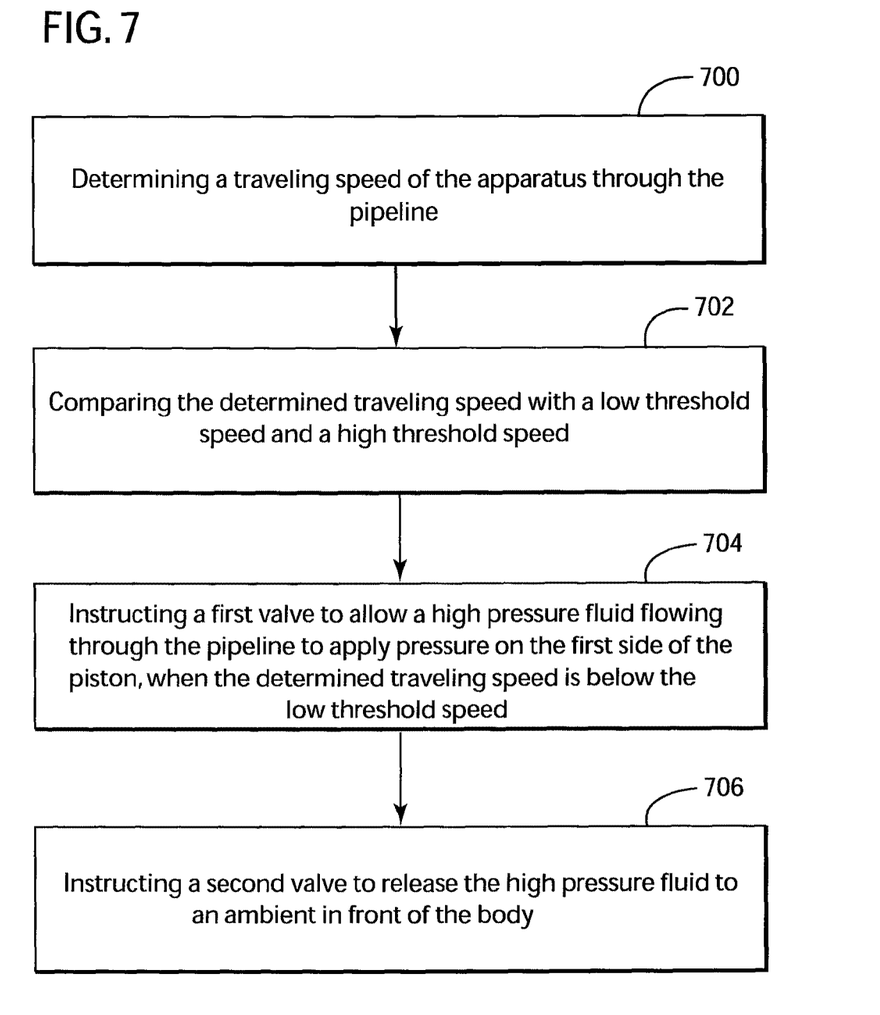
FIG. 7 is a flow chart illustrating a method of controlling a speed of a pipeline apparatus in accordance with exemplary embodiments.

According to another exemplary embodiment illustrated in FIG. 7, there is a method for controlling a speed of an apparatus that travels through a pipeline. The method includes a step 700 of determining a traveling speed of the apparatus through the pipeline, where the apparatus has a body through which a flow channel passes and the flow channel is connected to an inlet at the back of the body and to an outlet at a front of the body, a step 702 of comparing the determined traveling speed with a low threshold speed and a high threshold speed, a step 704 of instructing a first valve that fluidly connects a first side of a piston provided in a cavity of the body to allow a high pressure fluid flowing through the pipeline to apply pressure on the first side of the piston, when the determined traveling speed is below the low threshold speed, the opening of the valve determining a sleeve connected to the piston to decrease a flow of the fluid through the outlet, and a step 706 of instructing a second valve that fluidly connects the first side of the piston to an ambient in front of the body to release the high pressure fluid to an ambient in front of the body such that the sleeve moves to increase the flow of the fluid through the outlet. Thus, according to this embodiment, there is no motor actuating the sleeve and the piston.

Also in accordance with exemplary embodiments, software stored in hardware, such as a tangible, computer-readable medium, can be used to control the pipeline inspection apparatus described in detail throughout the above disclosure. For example, the medium can store a set of instructions which, when executed by a computer processor or other computer hardware, can decrease the speed of the apparatus by movement of the piston and the sleeve through operation of the motor. When the apparatus is moving through the pipeline too fast to inspect the pipeline or tow a tool through the pipeline, one or more speed sensors of the apparatus can determine that the speed of the apparatus is above a predetermined speed. A microprocessor in the apparatus can operate the motor to rotate the screw, so that the piston and the sleeve can move linearly toward the downstream side of the apparatus. As the piston and the sleeve move downstream, the flow area through which the fluid flows out of the outlet can increase, and the pressure differential between the upstream and downstream sides of the apparatus can decrease. As a result, the speed of the apparatus can decrease. When the speed sensors determine the apparatus is moving near or at the predetermined speed, rotation of the screw, and thus movement of the piston and the sleeve, can stop.

Alternatively, or in addition, the medium can store a set of instructions that can increase the speed of the apparatus. When the apparatus is moving through the pipeline too slow, one or more speed sensors of the apparatus can determine that the speed of the apparatus is below a predetermined speed. A microprocessor of the apparatus can operate the motor to rotate the screw (or control valves), so that the piston and the sleeve can move linearly toward the upstream side of the apparatus. As the piston and the sleeve move upstream, the flow area through which the fluid flows out of the outlet can decrease, and the pressure differential between the upstream and downstream sides of the apparatus can increase. As a result, the speed of the apparatus can increase. When the speed sensors determine the apparatus is moving near or at the predetermined speed, rotation of the screw, and thus movement of the piston and the sleeve, can stop.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended and are understood to be within the scope of the claims.

The invention claimed is:

1. A pipeline apparatus, comprising:
   a body configured to fit inside a pipeline;
   a flow channel formed within the body and including an inlet, an outlet, and a bypass channel connecting the inlet and the outlet, the inlet being configured to receive a portion of a fluid flowing through the pipeline, and the outlet being configured such that the fluid flowing through the bypass channel flows out of the flow channel through the outlet;
   a flow control valve attached to the body and including a sleeve configured to move to vary a flow rate of the fluid flowing out of the outlet;
   a motor provided in a chamber in the body and configured to move the sleeve;
   a diaphragm sealing the chamber in the body; and
   a lubricant disposed in the sealed chamber.

2. The pipeline apparatus according to claim 1, wherein the flow control valve comprises:
   a piston disposed in the chamber of the body and connected to the sleeve, the piston configured to move linearly in response to a rotation of the motor.

3. The pipeline apparatus according to claim 2, wherein the flow control valve comprises:
   a screw disposed in the chamber of the body and connected to the piston and to the motor, the piston configured to move linearly in response to a rotation of the screw, the screw being rotated through the rotation of the motor.

4. The pipeline apparatus according to claim 3, further comprising:
   a spring disposed in the chamber of the body and connected to the screw, the spring configured to apply a rotational bias to the screw.

5. The pipeline apparatus according to claim 4, wherein the chamber is filled with the lubricant, and the chamber is sealed to prevent leakage of the lubricant therefrom past the piston.

6. The pipeline apparatus according to claim 1, further comprising:
   a sensor disposed on the body and configured to determine a speed of the pipeline inspection apparatus in the pipeline; and a microprocessor configured to reduce the flow rate of the fluid flowing out of the outlet when the sensor determines the speed is below a first predetermined speed, and configured to increase the flow rate of the fluid flowing out of the outlet when the sensor determines the speed is above a second predetermined speed.

7. The pipeline apparatus according to claim 1, wherein the motor comprises a direct-current motor or stepper motor.

8. The pipeline apparatus according to claim 1, further comprising:
   a flexible membrane configured to balance a pressure of the lubricant in the sealed chamber against a pressure of the portion of the fluid flowing through the pipeline and received into the inlet; and
   a spring configured to bias the pressure of the lubricant.

9. A pipeline inspection apparatus, comprising:
   a body configured to fit inside a pipeline;
   an inspection portion attached to the body and configured to either magnetically inspect a wall of the pipeline, ultrasonically inspect the wall of the pipeline, inspect a geometry of the pipeline, or determine a location in the pipeline;
   a flow channel disposed within the body and including an inlet, an outlet, and a bypass channel connecting the inlet and the outlet, the inlet being configured to receive at least a portion of a fluid flowing through the pipeline, and the outlet being configured such that the fluid flowing through the bypass channel flows out of the bypass channel through the outlet;
   a flow control valve attached to the body and including a sleeve configured to move to vary a flow rate of the fluid flowing out of the outlet;
   a motor provided in a chamber in the body and configured to rotate to linearly move the sleeve;
   a diaphragm sealing the chamber in the body;
   a lubricant disposed in the sealed chamber;
   a flexible membrane configured to balance a pressure of the lubricant in the sealed chamber against a pressure of the portion of the fluid flowing through the pipeline and received into the inlet; and
   a spring configured to bias the pressure of the lubricant.

10. The pipeline inspection apparatus according to claim 9, wherein the flow control valve comprises:
    a piston disposed in the chamber of the body and connected to the sleeve, the piston configured to move linearly in response to rotation of the motor.

11. The pipeline inspection apparatus according to claim 10, wherein the flow control valve comprises:
    a screw disposed in the chamber in the body and connected to the piston and to the motor, the piston configured to move linearly in response to a rotation of the screw, the screw being rotated through rotation of the motor.

12. The pipeline inspection apparatus according to claim 11, wherein:
    the spring is disposed in the chamber in the body and is connected to the screw, the spring being configured to apply a rotational bias to the screw.

13. The pipeline inspection apparatus according to claim 12, wherein the chamber is filled with the lubricant, and the chamber is sealed to prevent leakage of the lubricant therefrom.

14. The pipeline inspection apparatus according to claim 10, further comprising:
    a sensor disposed on the body and configured to determine a speed of the pipeline inspection apparatus in the pipeline; and
    a microprocessor configured to reduce the flow rate of the fluid flowing out of the outlet when the sensor determines that the speed is below a first predetermined speed, and configured to increase the flow rate of the fluid flowing out of the outlet when the sensor determines that the speed is above a second predetermined speed.

15. A method of controlling a speed of a pipeline apparatus inside of a pipeline, the method comprising:
    flowing a fluid through a bypass channel formed in a body of the apparatus, to create a pressure differential between upstream and downstream sides of the apparatus that moves the apparatus in the pipeline;
    determining a speed of the apparatus moving through the pipeline; and
    varying an area of an outlet of the bypass channel to change a flow rate of the fluid flowing through the outlet and to achieve a predetermined speed different from the determined speed, and the area being varied by moving a sleeve with a motor,
    wherein the motor is located in a chamber in the body, a diaphragm seals the chamber in the body, and a lubricant is disposed in the sealed chamber.

16. The method according to claim 15, wherein determining the speed comprises determining that the speed is above the predetermined speed, and wherein varying the area comprises increasing the area of the outlet to decrease the flow rate of the fluid flowing through the outlet.

17. The method according to claim 15, wherein determining the speed comprises determining that the speed is below the predetermined speed, and wherein varying the area comprises decreasing the area of the outlet to increase the flow rate of the fluid flowing through the outlet.

18. The method according to claim 15, wherein the motor is fitted with an encoder to monitor a position of the sleeve and/or the sleeve is fitted with limit switches and/or a linear transducer to monitor the position of the sleeve.

* * * * *

UNITED STATES PATENT AND TRADEMARK OFFICE
CERTIFICATE OF CORRECTION

| | | |
|---|---|---|
| PATENT NO. | : 8,468,884 B2 | Page 1 of 1 |
| APPLICATION NO. | : 12/711942 | |
| DATED | : June 25, 2013 | |
| INVENTOR(S) | : Harvey et al. | |

It is certified that error appears in the above-identified patent and that said Letters Patent is hereby corrected as shown below:

In the Specification,

In Column 7, Line 35, delete "1200;" and insert -- 1200, --, therefor.

In Column 8, Line 28, delete "flow control valve 1330." and insert -- flow control valve 1300. --, therefor.

Signed and Sealed this
First Day of September, 2015

Michelle K. Lee
*Director of the United States Patent and Trademark Office*